June 11, 1935.　　P. LA F. MAGILL　　2,004,332
TREATING SOLIDS WITH LIQUID
Filed Oct. 17, 1932
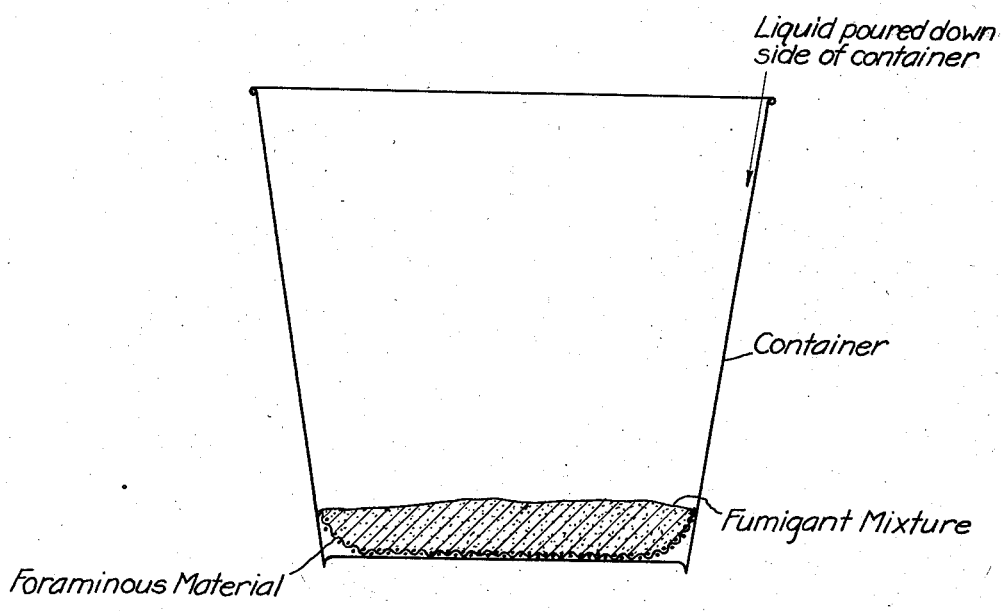
INVENTOR.
Paul LaFrone Magill
BY
ATTORNEY Patented June 11, 1935

2,004,332

UNITED STATES PATENT OFFICE 2,004,332

TREATING SOLIDS WITH LIQUID

Paul La Frone Magill, Niagara Falls, N. Y., assignor to E. I. du Pont de Nemours & Company, Inc., Wilmington, Del., a corporation of Delaware Application October 17, 1932, Serial No. 638,183

9 Claims. (Cl. 23—151)

This invention relates to a process for treating a solid material with a liquid, the generation of hydrocyanic acid gas, and more particularly to the generation of hydrocyanic acid from solid cyanide substances by reaction with water.

It has been proposed to generate hydrocyanic acid by reacting water with a mixture of alkali metal cyanide and a salt having a base which forms an unstable cyanide and in addition, when desired, a salt having a high heat of hydration. In addition to this method of generating hydrocyanic acid, unstable cyanides, for instance an alkaline earth metal cyanide such as calcium cyanide, may be reacted with water to generate hydrocyanic acid. In order to utilize these methods of generating hydrocyanic acid for fumigation purposes, the solid pulverant cyanide material is placed in a suitable container and water is added thereto at the point of use. A disadvantage in this operation is that the water often does not uniformly penetrate the cyanide material and consequently does not react with all the cyanide. Furthermore, the usual method of applying water to pulverant masses in this manner has been to pour the water over the surface. As a result the evolved gases must necessarily bubble through the excess water and force their way through the water laden material on the surface. In addition to the resistance to the escape of the hydrocyanic or other gases, there is increased resistance to the penetration of the water downward. In some cases this resistance is so serious that the reaction material may become caked and the water will not reach the lower layers at all. This results in a waste of fumigating material, ineffective concentration of the hydrocyanic acid, and the remaining residue, which contains relatively large amounts of reacted cyanide material, is hazardous to handle.

An object of this invention is to treat a solid material with a liquid in such manner that the liquid is quickly and uniformly distributed throughout the solid material. A further object is to provide a method whereby solid cyanide materials may be reacted with water to generate hydrocyanic acid in such manner that the added water will be uniformly distributed throughout the mass of cyanide material, and the gases will escape freely. Further objects will be apparent from the following description.

These objects are accomplished, according to my invention, by introducing the liquid in such manner that it penetrates upwardly in a substantially uniform manner throughout the mass of solid material. While, from some methods of introduction of the liquid some of the penetration may be from one side as well as from the bottom, in general the liquid introduction is in such manner as to leave at least a portion of the surface and contiguous portions below the surface dry as long as there is any appreciable amount of material under the surface not yet contacted with water.

There are several ways of securing this penetration of the liquid upward through the mass to be treated such as for example, supporting the mass on a perforated plate over a water chamber and supplying the liquid to this chamber through an external tube connection; other special apparatus could thus be constructed on the same principle. Such methods, however, are unsatisfactory in that the amount of water in the reservoir below the false bottom is never used and would afford a problem in residue disposal; also solid material would enter and clog this chamber.

I have discovered that if a layer of pulverant material is spread on a foraminous or perforated sheet in the nature of a movable false bottom placed directly on the bottom of a container, that the reaction water can be introduced beneath such sheet and will tend to raise it and will pass through the sheet and thereafter penetrates uniformly upwards through the solid material. By this method it is unnecessary to add more water than is required to react with the solid material.

My invention is not to be confused with the expedients mentioned above in which a chamber is provided beneath a false perforated bottom in the vessel. Such structures are undesirable, since they leave an excess of liquid in the chamber which cannot penetrate upwards, whereas according to my invention, the material is placed on its pervious sheet directly on the bottom of the container and will therefore take up substantially all of the liquid provided. The amount of liquid added having been previously adjusted to the requirements of the mass, substantially all of the solid is contacted with liquid, and at the same time excess water and the resulting pasty mass may be avoided.

One method of carrying out my invention comprises placing a layer of pulverant, granular or porous solid material on a foraminous or perforated sheet and introducing the liquid beneath said sheet. The liquid flows through the sheet and penetrates uniformly throughout the layer of solid material. The sheet may be of any material which is pervious to water, for instance perforated metal or wooden plates, wire screen or coarsely woven cloth. I prefer to use a coarsely woven cotton cloth, for instance the type known as "cheesecloth." According to my preferred method, as illustrated in the appended drawing, a piece of cheesecloth is placed in the bottom of a suitable container and a layer of pulverant solid material is placed thereon to a suitable depth, for instance several inches. Water is then introduced below the surface of the cloth and caused to flow therethrough into the body of the solid material. A convenient method of applying the water is to cause it to flow down one side of the interior container wall, preferably in a narrow stream. The down-flowing stream of water penetrates the solid material adjacent to the container wall by reason of its mechanical force and thence flows beneath the foraminous sheet. When the foraminous sheet is of a light material such as a cotton cloth, the water appears to first form a small pool and the natural buoyancy and flexibility of the cloth causes the edge at that point to rise sufficiently to start the flow of water beneath the cloth. The momentum of the down-flowing water then causes the bulk of it to flow under the cloth and spread out over substantially the entire area covered by the cloth. The water flowing beneath the cloth is quickly conducted therethrough and penetrates upwardly through the solid material in a uniform manner. When a water-pervious sheet which lacks the flexibility and/or buoyancy of cloth is used, the water must be introduced thereunder by other means which will be apparent to one skilled in mechanical principles.

The following example illustrates the use of my invention for the generation of hydrocyanic acid by treating a solid cyanide material with water.

*Example I*

A circular piece of cotton cheesecloth was placed so as to entirely cover the bottom of a cylindrical galvanized iron container having a diameter of about 20 inches. Twenty-five pounds of a pulverant fumigant mixture, containing about 30% by weight of sodium cyanide and about 70% by weight of dehydrated aluminum sulfate, was placed upon the cloth making a continuous layer about 2 or 3 inches in thickness, entirely covering the cloth.

About twenty-five pounds of water was added to the salt by pouring the water down one side of the interior of the container. The water flowed through the salt layer adjacent the side wall at the point of contact and penetrated below the cheesecloth. Thence, it flowed upwards through the cheesecloth and penetrated the mass of salt; a small portion of the water was of course absorbed from the side at the point of contact. After the evolution of hydrocyanic acid was complete, the residue consisted of a spongy, friable mass of practically dry salts. Upon analysis of the residue it was found that 92.58% of the cyanide in the original mixture had reacted with the water.

*Example II*

The procedure described in Example I was repeated except that in place of cheesecloth a perforated cardboard disc was used, and means were provided for introducing water beneath the surface of the cardboard by way of an opening at the center thereof. In this case, analysis of the residue showed that 92.7% of the cyanide in the original mixture had reacted with the water. Examination of the residue indicated that water had penetrated uniformly throughout all parts of it.

*Example III*

A two-inch layer of the aluminum sulfate-cyanide mixture, described in Example I, was placed in the bottom of a cylindrical container and water was added thereto by flowing it down one side of the interior wall without using the foraminous sheet. This was repeated a large number of times; in a group of thirteen runs the average amount of cyanide which reacted was 83.9% of that in the original mixture. In some of the runs the amount of cyanide reacted was as low as 61.0%.

Various methods of carrying out my invention will be apparent to those skilled in the handling of materials. For instance, the solid material may be supported at the bottom of a container on a pervious or perforated sheet and water may be introduced under this said sheet, for instance by means of suitable pipe connections. Another possible modification of my invention comprises placing the solid material in a shallow container of pervious material and lowering it into a suitable vessel which contains the required amount of water to be absorbed by or reacted with the solid material.

It will be understood that my invention is not restricted to the reaction of water with cyanide mixtures to generate hydrocyanic acid; but also is applicable to other reactions between liquid and solid materials. It also may be used to saturate solid materials with a liquid.

The chief advantage of my invention is that it provides a means for obtaining rapid and uniform distribution of a liquid through a mass of solid material. For example, in the use of my invention for generating hydrocyanic acid, this uniform distribution of water throughout the mass of cyanide mixture insures complete reaction of the cyanide. This results in a suitable yield of hydrocyanic acid gas and prevents wastage of materials. Moreover, by insuring complete reaction of the cyanide, my invention obviates the hazards incident to removing and disposing of the reaction residues. When the invention is carried out according to my preferred method it is simple in operation and does not require expensive apparatus or materials. A further advantage of the invention is that it may be used to aid in the removal of reaction residue from the container. For instance, if a shallow container is used as indicated above, the reaction residue may be removed intact by simply removing the container after the reaction is complete.

I claim:

1. A process for generating hydrocyanic acid comprising introducing water over an extended area on the under side of a movable false bottom pervious to water and supporting a layer of solid material capable of reacting with water to generate hydrocyanic acid in such manner that the water is substantially entirely absorbed by said solid material.

2. A process for generating hydrocyanic acid comprising placing a layer of solid material capable of reacting with water to generate hydrocyanic acid on a sheet of material pervious to water and applying water to the under side of said sheet in such manner that the water is substantially entirely absorbed by said solid material.

3. A process for generating hydrocyanic acid comprising placing a layer of a pulverant mixture of alkali metal cyanide and anhydrous aluminum sulfate on a sheet of foraminous material and applying water to under side of said foraminous material in such manner that the water is substantially entirely absorbed by said solid material.

4. A process for generating hydrocyanic acid comprising placing a layer of a pulverant mixture of sodium cyanide and anhydrous aluminum sulfate on a sheet of cotton cloth and applying water to under side of said cloth in such manner that the water is substantially entirely absorbed by said solid material.

5. A process for generating hydrocyanic acid comprising placing a layer of solid material capable of reacting with water to generate hydrocyanic acid upon a sheet of material pervious to water in a container and introducing water beneath said sheet.

6. A process for generating hydrocyanic acid comprising placing a layer of a pulverant mixture of alkali metal cyanide and anhydrous aluminum sulfate upon a sheet of foraminous material in a container and introducing water beneath said sheet.

7. A process for generating hydrocyanic acid comprising placing a layer of a pulverant mixture of sodium cyanide and anhydrous aluminum sulfate upon a sheet of cotton cloth in a container and introducing water beneath said sheet.

8. A process for generating hydrocyanic acid comprising placing a layer of a solid material capable of reacting with water to generate hydrocyanic acid upon a sheet of foraminous material in a container and introducing water beneath said sheet by flowing the water down the container wall.

9. A process for generating hydrocyanic acid comprising placing a layer of a pulverant mixture of alkali metal cyanide and anhydrous aluminum sulfate upon a sheet of cotton cloth in a container and introducing water beneath said sheet by flowing the water down the container wall.

PAUL LA FRONE MAGILL.